INVENTOR.
GERHARDT N. THOEN

United States Patent Office 3,559,491
Patented Feb. 2, 1971

3,559,491
GAS SAMPLING PROBE
Gerhardt N. Thoen, Kelso, Wash., assignor to Weyerhaeuser Company, Tacoma, Wash., a corporation of Washington
Filed Mar. 10, 1969, Ser. No. 805,499
Int. Cl. G01n 1/24
U.S. Cl. 73—421.5          10 Claims

ABSTRACT OF THE DISCLOSURE

A gas sampling probe is disclosed for sampling particulate and moisture laden gases. The probe comprises a tubular shielding member having an open end in the gas flow path and a tubular sampling probe mounted concentrically within the shielding member. The sample probe is made of a low heat conductive substance permeable to moisture. Particularly useful are ceramic materials. The probe (1) allows moisture to evaporate through it into the atmosphere, (2) cools the gas sample without degradation thereof, and (3) is corrosion resistant. Particulate matter which deposits in the sampling probe is removed by periodically flushing the tubular probe with compressed air or other fluid. Valve means periodically and selectively connects the flushing fluid to the probe member.

BACKGROUND OF THE INVENTION

Field of the invention

This invention relates to a gas sampling probe useful in conjunction with conventional gas analytical apparatus.

PRIOR ART RELATING TO THE DISCLOSURE

The accurate sampling of flue gases or other industrial gases is rapidly becoming more and more important as stricter air pollution regulations are being passed by both State and Federal authorities. Identification and concentration of the gases being exhausted into the atmosphere on a continuous basis is becoming more and more important as industry attempts to comply with the enacted legislation. By continuous monitoring of the gas content of combustion operations, the combustion operation can be evaluated and corrections made rapidly if needed.

Industrial gases from power boilers, black liquor recovery furnaces, blast furnaces, lime kilns, etc. normally contain particulate matter and condensable materials, mainly water vapor. Obtaining a representative sample of the gaseous effluent from a stack is highly critical when the components making up the gaseous mixture are used as a criterion to optimize and control the then-existing conditions of a combustion operation. To get an accurate identification and concentration of the gases contained in a typical gas sample the gas sample must be substantially free of moisture and particulate matter. In addition the sampling probe used must be able to withdraw the gas sample and deliver it to the analytical apparatus without degradation or alteration of the compounds contained in the gas. If the gas sample is subjected to sudden temperature changes some degradation or alteration of the compounds contained therein is likely to occur, thereby causing erroneous results.

Particulate matter such as dust, soot, lint, etc. tends to, over a period of time, plug the sampling probe inserted into the gas flow path.

A gas sampling apparatus is disclosed in U.S. Pat. 3,391,577 wherein a sample of effluent gas containing particulate matter and condensable gases is conveyed to a column wherein gas-liquid contact takes place and wherein the gas sample is washed free of any solid contaminate. Simultaneously, condensables such as steam are condensed and transported from the gas inlet side of the column and recycled in an inert carrier liquid to the gas outlet side of the column.

Contrary to the apparatus disclosed in the above-mentioned patent, the gas sampling apparatus of this invention is much simpler, has fewer parts and is capable of operating efficiently over extended periods of time.

SUMMARY OF THE INVENTION

This invention has as its main object a probe for sampling gases containing particulate matter and condensables. A further object of this invention is a gas sampling probe for sampling effluent gases of combustion furnaces such as black liquor recovery furnaces, power boilers, lime kilns, etc.

A still further object of the invention is a gas sampling apparatus which continuously withdraws sample gases without substantial degradation and/or alteration thereof.

The gas sampling probe of this invention comprises (1) a hollow tubular shielding member having an open end adapted to be positioned in a gas flow path, (2) a hollow sampling probe mounted within the shielding member with clearance therefrom and having an open end for receiving a gas sample, and (3) means for periodically injecting a flushing fluid, usually compressed air or an inert gas, through the sampling probe counter to the gas sample flow and out the open end thereof to clear the probe of particulate matter deposited therein. The sampling probe is preferably an elongated tubular member of a material which has low heat conductivity and which is permeable to the flow of condensable materials as water vapor. Ceramic materials such as mullite and alumina have been found particularly suitable.

DETAILED DESCRIPTION OF THE INVENTION

Figure 1:
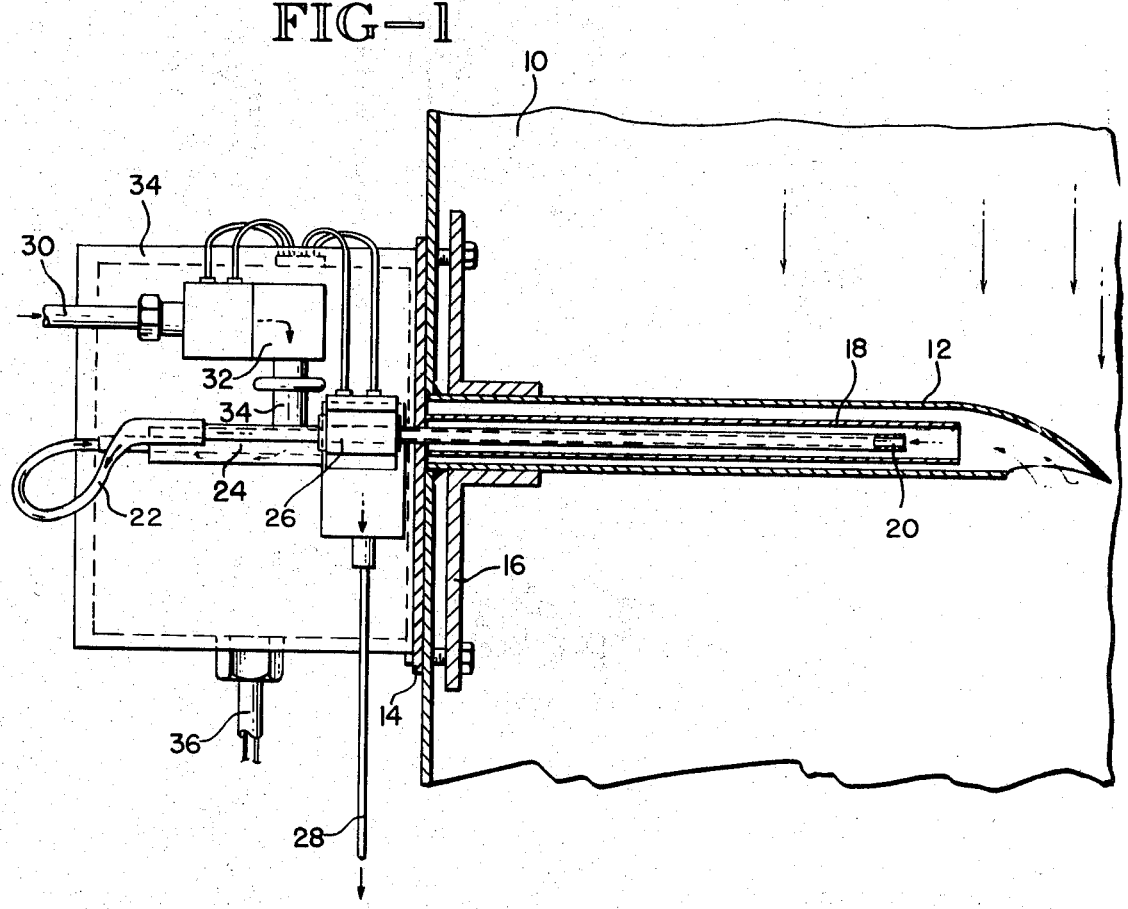
FIG. 1 is a sectional view of the sampling probe of the present invention mounted in a side wall of a furnace stack.

The probe of this invention is mounted in the wall of the furnace or in a stack leading from the furnace. An elongated tubular protective shield 12 of stainless steel or other corrosion resistant material is inserted through the stack or wall of the furnace into the gas flow path. The end of the tube in the gas flow path has a hood-like portion thereon to prevent particulate matter present in the gas from being drawn into the probe. As shown in the drawings the opening in the end of the protective shield 12 is opposite the direction of flow of the gas within the stack. The opposite end of shield 12 is welded in place to the wall of the furnace stack and is further secured by attachment to support plate 14 on the outside wall of the stack and plate 16 of the inside wall of the stack.

Within tubular shield member 12 are placed one or more tubular members or sampling probes 18 and 20 made of a material with low heat conductivity and permeability to condensable gases such as water vapor. Cast ceramic tubes, such as Coors AD 99, have been found to work satisfactorily as sampling probes. Other ceramic materials are equally applicable provided they are permeable to the flow of moisture therethrough and have fairly low heat conductivity. As shown in FIG. 1 tubular member 18 surrounds sampling probe 20. If desired tubular member 18 can be omitted although better results have been obtained by mounting probe 20 concentrically within ceramic tube 18 and protective shield 12. Tubular ceramic probe 20 extends from the gas flow path inside the furnace stack through an opening in the stack wall. The end of probe 20 is connected to a flexible piece of tubing 22 and to conduit 24 leading by way of valve 26 to conduit 28 which is connected to a conventional gas analysis apparatus (not shown). Valve 26 is solenoid operated and, in its normally open position, allows the gas sample withdrawn from the gas flow path to flow directly to the gas analysis apparatus. A vacuum created in conduit 28 by a vacuum pump continuously withdraws a gas sample from the gas flow path within the furnace or furnace stack.

Over a period of time fine particulate matter, drawn into the sampling probe along with the gas sample, is deposited within the probe. If the particulate matter is not removed it will eventually plug the sample probe. To alleviate this problem the sample probe is periodically flushed with a flushing fluid flowing counter to the normal gas flow through the sample probe. Compressed air or other gaseous fluid under pressure is supplied through conduit 30, solenoid operated valve 32 and conduit 34 to probe member 20. Valve 32, in its normally closed position, prevents the flushing fluid from entering probe member 20.

Valves 26 and 32, both solenoid operated, are connected to a cycle timer 34. At predetermined intervals valve 26 is closed and valve 32 opened, thereby allowing a flushing fluid to blow probe member 20 free of any accumulated particulate matter. The timer is connected by means of wire 36 to a suitable source of electricity.

Figure 2:
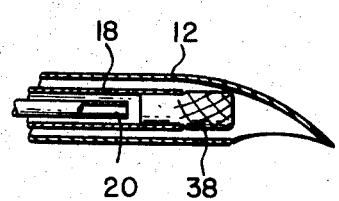
FIG. 2 is a sectional view of a portion of the sampling probe illustrating a modification of the probe.

It has also been found that probe member 20 can be kept free of particulate matter for longer periods of time by insertion of a filter means such as a ceramic frit 38 (see FIG. 2) in the sampling end of probe member 20. The particulate matter is retained by the frit in the hot, higher than dew point zone. On flushing the probe member with compressed air the particulate matter is blown back into the furnace.

Flue gases from a typical black liquor recovery furnace issue at a temperature of approximately 700° F. and normally contain approximately 30% water by volume and 4 to 12 grains particulate matter per SCFM (standard cubic feet per minute). Because the gas is corrosive by nature most metallic materials will not operate for long time periods in such an atmosphere. The unique ceramic sampling probe of this invention is corrosion resistant and capable of sampling the gas content continuously and efficiently. On withdrawal of a gas sample from the gas flow path of a furnace stack the ceramic probe, having low heat conductivity, does not thermally shock the gas sample. In addition, substantially all of the moisture contained in the gas sample evaporates through the probe into the atmosphere with little or no degradation of the gas sample. Previously known probes were not capable of removing moisture from a gas sample without degradation thereof.

Although the probe described herein has particular utility in sampling flue gases in black liquor recovery furnaces, it is capable of being used in many other industrial combustion operations.

The embodiments of the invention in which an exclusive property or privilege is claimed are defined as follows:

1. A sample probe for withdrawing a gas sample from a gas flow path and delivering it to a gas analysis apparatus substantially free of particulate matter and moisture comprising:
   (a) a hollow shielding member having an open end adapted to be positioned in said gas flow path, and
   (b) a hollow sampling probe mounted within said shielding member with clearance therefrom and having one end open for receiving said gas sample and another end open for delivering said sample to said analysis apparatus, said probe comprising a material permeable to moisture and of low heat conductivity.

2. The probe according to claim 1 including means at said other end of said sampling probe for withdrawing said sample.

3. The probe according to claim 1 including flushing means for periodically directing a flushing fluid counter to said gas sample flow through said sampling probe and out said one open end to clear said probe of particulate matter deposited therein.

4. The probe according to claim 3 wherein said flushing means includes:
   (a) a conduit communicating with said sampling probe for conducting fluid to said probe,
   (b) a source of flushing fluid,
   (c) valve means interconnecting said flushing fluid source and said probe member, and
   (d) timer means for periodically and selectively connecting the flushing fluid source to the probe member.

5. The probe according to claim 4 further comprising filter means disposed in said one open end of said probe member for removing fine particulate matter from said gas sample.

6. The probe according to claim 5 wherein said filter means comprises a ceramic frit.

7. The probe according to claim 1 wherein said sampling probe comprises a ceramic material.

8. The probe according to claim 7 wherein said ceramic comprises mullite.

9. The probe according to claim 7 wherein said ceramic comprises alumina.

10. The probe according to claim 1 wherein said shielding member and sampling probe are tubular.

References Cited

UNITED STATES PATENTS

| 1,890,592 | 12/1932 | Stein et al. | 73—421.5(A) |
| 3,006,194 | 10/1961 | Greene et al. | 73—421.5(A) |
| 3,070,990 | 1/1963 | Krinov | 73—421.5(A)X |
| 3,240,069 | 3/1966 | Kennedy | 73—421.5(A) |
| 3,391,577 | 7/1968 | Friauf et al. | 73—421.5 |

FOREIGN PATENTS

| 756,380 | 9/1956 | Great Britain | 73—421.5(A) |
| 796,010 | 6/1958 | Great Britain | 73—421.5(A) |

LOUIS R. PRINCE, Primary Examiner

H. C. POST III, Assistant Examiner